(12) United States Patent
Detable et al.

(10) Patent No.: US 6,568,043 B1
(45) Date of Patent: May 27, 2003

(54) CLAMPING RING

(75) Inventors: Pascal Detable, Gievres (FR); Henri Viratelle, Mont Saint Sulpice (FR); Michel Andre, Romorantin-Lanthenay (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 0 days.

(21) Appl. No.: 09/980,616

(22) PCT Filed: Jun. 8, 2000

(86) PCT No.: PCT/FR00/01583
§ 371 (c)(1),
(2), (4) Date: Feb. 12, 2002

(87) PCT Pub. No.: WO00/75552
PCT Pub. Date: Dec. 14, 2000

(30) Foreign Application Priority Data

Jun. 8, 1999 (FR) .............................. 99 07225

(51) Int. Cl.⁷ ............................ F16C 33/02
(52) U.S. Cl. .................... 24/20 R; 24/20 TT
(58) Field of Search ............ 24/20 R, 20 TT, 24/20 EE, 20 CW

(56) References Cited

U.S. PATENT DOCUMENTS

| 4,674,720 A | 6/1987 | Fetsch | |
| 4,713,863 A | * 12/1987 | Jennings | 24/20 R |
| 4,742,600 A | 5/1988 | Calmettes et al. | |
| 6,052,873 A | * 4/2000 | Cuno | 24/20 R |

FOREIGN PATENT DOCUMENTS

| CH | 679178 A5 | 12/1991 | |
| DE | 197 50 010 C1 | 5/1999 | |
| EP | 454 661 A1 | 10/1991 | |
| FR | 2 683 869 | 5/1993 | |
| GB | 2 235 948 A | 3/1991 | |
| JP | 07035112 A | * 2/1995 | F16B/2/08 |

* cited by examiner

Primary Examiner—James R. Brittain
(74) Attorney, Agent, or Firm—Nath & Associates PLLC; Gary M. Nath; Marvin C. Berkowitz

(57) ABSTRACT

The collar is formed by rolling up a strip (10). First fastening means formed by a hook (14) projecting radially are located at a first end (10A) of the strip, while second fastening means comprising a retaining element (12) projecting radially and suitable for constituting with said hook to close the collar are located at the second end (10B) of the strip. The free edge (14A) of the hook is suitable for being engaged beneath a rim (13) formed to project radially outside relative to the collar in the vicinity of the retaining means (12) while the retaining means are engaged beneath the hook so as to close the collar. The hook is preferably formed by an embossed projection regardless of whether or not the rim (13) is present.

22 Claims, 3 Drawing Sheets

CLAMPING RING

The present invention relates to a clamping collar made from a rolled-up strip, first fastening means formed by a hook projecting towards the outside of the collar and occupying a first end of the strip, and second fastening means occupying the second end of the strip, said second fastening means comprising a retaining element which projects towards the outside of the collar and which is suitable for being engaged beneath the hook to close the collar.

Clamping collars are already known, e.g. from European patent application No. 0 003 192, constituted by a rolled-up strip and suitable for being fastened together and clamped by engaging a hook on a projecting lug, e.g. formed by two radial folds.

The fastening means of that type of collar presents the advantage of being simple to make and to implement. In some cases, it can be desirable to make collars which are reusable, in which case it must be possible to unfasten the fastening means so as to open the collar, to put it back into place on an object to be clamped, and to reclose it. Nevertheless, in other cases it is appropriate to ensure that the collars are not reusable. For example when the collar is used for clamping a hose onto an endpiece through which a fluid flows, it can be desirable to ensure that the connection cannot be taken apart in order to avoid any risk of it being reassembled wrongly. Such a risk is unacceptable in certain applications, for example gas connections where maximum safety is essential. Furthermore, it is desirable to avoid any untimely unfastening of the collar.

German patent application No. DE 39 06 636 shows a collar having a first end with a slot and a second end presenting a retaining element formed by a tongue that projects radially outwards. When the collar is in the clamped state, the tongue fastens in the slot. Nevertheless, in that situation, the tongue is not protected in any way and it can be pushed back inwards so as to enable the collar to be unfastened.

In a first embodiment, an object of the invention is to provide a collar of the above-specified type using first fastening means formed by a hook and second fastening means comprising a retaining element capable of being engaged beneath the hook to close the collar, in which unfastening is made impossible or at least extremely difficult.

In the collar of the invention, this object is achieved by the fact that the hook presents a free edge extending substantially on the surface of a cylinder defined by the rolled-up strip, while the second fastening means further comprises a rim projecting towards the outside of the collar and formed in the vicinity of the retaining element, the free edge of the hook being suitable for being engaged beneath the rim while the retaining element is engaged beneath said hook in order to close the collar.

By means of this disposition, the free edge of the hook is "protected" by the projecting rim so that it is not possible to take hold of said free edge with a tool in an attempt to open the collar. Furthermore, the connection provided by the fastening is guaranteed since the hook is held in position folded down against the strip where it carries the second fastening means by the free edge of the hook being engaged under the rim (thereby guaranteeing that co-operation between said hook and the retaining element is effective).

In the collar of the invention, the retaining element of the second fastening means is fitted to the inside strand of the strip while the hook of the first fastening means is fitted to the outside band of the strip. This ensures that when the collar is closed, the hook covers the retaining element and the first end of the strip which carries said hook radially overlies the second end of the strip. Consequently, the hook itself protects the retaining element which can no longer be taken hold of with a tool in order to unfasten the collar. It should be observed that the effectiveness of the fastening can also be associated with the fact that the retaining element has a tendency, due to the object which is clamped by the collar, to project radially so as to co-operate with the hook.

Thus, both the hook and the retaining element project radially outwards from the collar relative to the surface of the cylinder defined by the strip so they are both "protected" against any handling attempting to open the collar after it has been clamped. The outward direction is the direction which tends to go away from the axis of the cylinder formed by the rolled-up strip.

Advantageously, the hook is of a width measured in the axial direction of the cylinder formed by the rolled-up strip, which is less than the width of the strip measured in the same direction.

Under such circumstances, it is advantageous for the rim belonging to the second fastening means to present lateral branches extending substantially lengthwise relative to the strip, said hook being suitable for being engaged between said branches when the collar is in the closed position.

By means of this disposition, not only is the free edge "protected" by the rim, but so also are the lateral edges of the hook. It should also be observed that the lateral branches of the rim enable the outside strand of the strip to be guided in displacement relative to the inside strand of the strip during fastening, thereby guaranteeing that fastening takes place in exactly the desired position of the hook relative to the retaining element.

In a particularly advantageous variant, the second end of the strip presents a cutout leaving a tongue which constitutes the retaining element, a portion of the edge of said cutout facing said tongue being deformed substantially radially towards the outside of the collar, thereby forming said rim.

Under such circumstances, the retaining element and the rim of the second fastening means are made very simply since a stamping or punching operation makes it possible simultaneously to cut out the tongue and to emboss the outline zone of the cutout in order to form the rim.

It is also advantageous for the hook to be formed by a projection formed at the first end of the strip, which projection has a fraction of its outline preserved to lie substantially in the plane of the strip and form said free edge of the hook.

Under such circumstances, the hook itself is made by a simple stamping operation that forms this projection. As a result the portion of the strip adjacent to the zone in which the projection is to be formed can be held in the plane of the strip, thereby making the free edge of the hook that is to be engaged beneath the rim.

It should be observed that this variant is also compatible with obtaining a hook of width that is narrower than the width of the strip. The free edge of the hook can be defined by a cutout formed in the strip.

In the clamping collar disclosed in European patent application No. 0 003 192, the hook is formed by making successive folds in the first end of the strip. That system has been found to be entirely satisfactory and millions of such collars have been manufactured. Nevertheless, the folding operations necessary for making the hook necessitate a plurality of successive steps of passing through different folding tools. Furthermore, the fold angles are very sharp and it can happen that cracks or zones of excessive weakness appear in the folds.

In a second embodiment, the invention thus seeks to improve the collar of European patent application No. 0 003 192 in order to overcome those difficulties.

Thus, the invention applies to a clamping collar made from a rolled-up strip, first fastening means formed by a hook located at a first end of the strip, and second fastening means located at the second end of the strip, said second fastening means comprising a retaining element projecting substantially radially relative to the strip and suitable for being engaged beneath the hook to close the collar.

According to the invention, the hook is formed by a projection which is made at the first end of the strip and which is of a width measured in the axial direction of the cylinder formed by the rolled-up strip that is less than the width of the strip as measured in the same direction, and the width of the retaining element as measured in the same direction is no greater than the width of the inside face of the hook.

The projection can be made very simply by stamping, e.g. using only one or two passes of a press tool. For example, the first pass can enable a "primary projection" to be formed that is substantially hemispherical, while the second pass gives the hook its final shape. The hook obtained in this way is very strong and any risk of malfunction is considerably reduced. Furthermore, the hook is rigid and does not run any risk of deforming after fastening.

Advantageously, the width of the retaining element is substantially equal to the width of the inside face of the hook.

The hook-forming projection presents cheeks extending substantially lengthwise relative to the strip, and while it is being fastened with the retaining element, the hook is well restrained in the axial direction of the cylinder formed by the rolled-up strip, thereby making it possible to avoid any risk of unfastening due to the strip twisting and the hook moving in said axial direction relative to the retaining element.

Advantageously, the second end of the strip presents a cutout leaving a tongue which constitutes the retaining element.

Under such circumstances, the retaining element is made very simply, likewise in a single pass of a tool, or in two passes.

In an advantageous disposition, a gap is formed between the tongue and the edge of said cutout, said gap being suitable for receiving at least a portion of the free edge of the hook. This gap can be provided beneath the above-mentioned rim, or quite simply by clearance due to the distance obtained between the free edge of the tongue and the edge of the cutout in the plane of the strip.

The invention will be well understood and its advantages will appear more clearly on reading the following detailed description of embodiments given as non-limiting examples. The description refers to the accompanying drawings, in which.

The collar of the invention is made in particular from a metal strip, e.g. of a steel of the type commonly used for making clamping collars.

The collar shown in the figures is thus made from a strip 10 which is rolled up between a first end 10A and a second end 10B.

Figure 2:
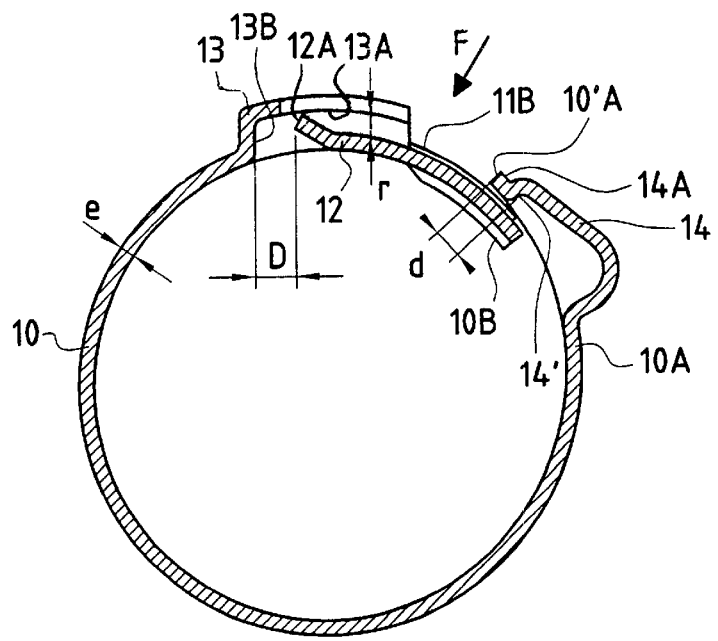
FIG. 2 is a section view on a longitudinal line of the strip referenced II—II in FIG. 1, FIG. 2 showing the collar in the open state.
Figure 3:
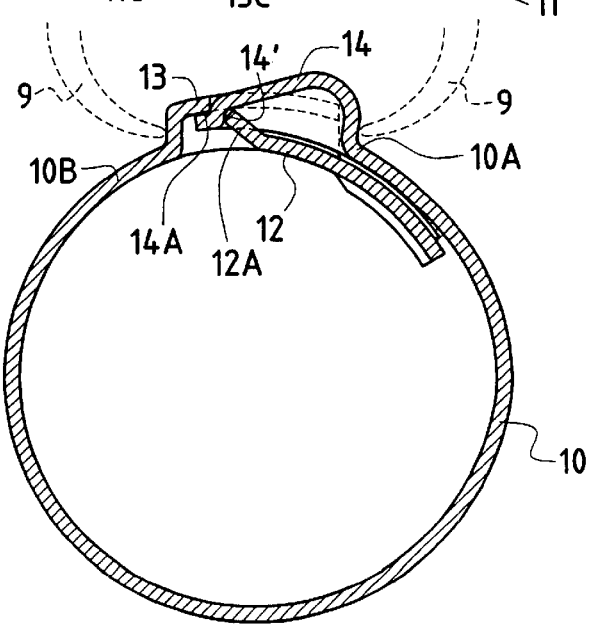
FIG. 3 is a view analogous to FIG. 2, in which the collar is shown in the closed state.

The second end 10B carries second fastening means which comprise a retaining element formed by a tongue 12 which, as can be seen in FIGS. 2 and 3 projects radially outwards a little from the collar (in the centrifugal direction). This second fastening means also comprises a rim 13 formed in the vicinity of the tongue. The rim 13 also projects radially from the strip which forms the collar.

Reference 13A designates the inside face of the rim, i.e. its face directed towards the center of the collar. It is at a radial distance r from the cylinder formed by the strip 10. This radial distance r is at least substantially equal to the thickness e of the strip. Preferably, the distance r lies in the range 1.2 e to 2.5 e.

The first end 10A of the strip carries a hook 14. As can be seen in FIG. 3, when the collar is in the closed state, the hook overlies the retaining element formed by the tongue 12 and the tongue is engaged beneath the hook so that its free edge 12A is locked against the front inside edge 14' of the hook 14 (which edge is situated beside the free end of the end 10A of the strip).

The hook is shaped to project radially relative to the strip 10. Nevertheless, it can be seen that it presents a free edge 14A which extends substantially in the "plane" of the strip 10, i.e. which lies substantially on the cylindrical surface defined by the rolled-up strip. In other words, the free edge 14 does not project radially relative to the strip.

The distance measured lengthwise relative to the strip between the free end 10'A of the first end 10A of the strip having the free edge 14A, and the inside edge 14' of the hook with which the tongue 12 co-operates, is referred to as the distance d. Still measured lengthwise relative to the strip, the distance between the free end 12A of the strip 12 and the substantially radial wall 13B defined by the rim 13 facing said end 12A is referred to as the distance D. The distance D is at least substantially equal to the distance d, and is preferably slightly greater than said distance.

As a result, and also taking account of the fact that the above-mentioned distance r is at least substantially equal to the thickness e of the strip, the free edge of the hook can be engaged under the rim 13 when the collar is in the closed state, i.e. when the free end 12A of the tongue co-operates with the inside edge of the hook. This is the situation shown in FIG. 3, where the free edge 14A of the hook is "jammed" between the end 12A of the tongue 12 and the rim 13. The free edge of the hook is protected and cannot be taken hold of by a tool in order to loosen the collar. It should also be observed that fastening is properly ensured since the rim 13 tends to prevent the hook from being capable of being pushed radially outwards, whereas reaction from the clamped object tends to push the tongue radially outwards so that it engages securely beneath the hook.

The collar can be clamped and fastened by means of pliers having jaws 9 drawn in dashed lines in FIG. 3 that bear respectively behind the hook 14 and behind the rim 13.

FIG. 2 shows that the free end portion of the end 10A carrying the hook is of a width L1 which is smaller than the running width L2 of the strip. These widths are measured in the axial direction of the cylinder formed by the rolled-up strip.

The end portion in which the hook is formed is defined between cutouts 11. In the advantageous embodiment shown, these cutouts are symmetrical and the hook is centered on the longitudinal axis L of the strip.

The hook is formed by a projection which preserves a non-deformed margin at its outline corresponding to the free edge of the strip, which margin is thus located on the cylinder defined by the rolled-up strip. This margin comprises the above-mentioned free edge 14A together with free lateral edges 14B and 14C which extend in the lengthwise direction of the strip, while the free edge 14A extends across its width. The width L3 of the hook proper is thus itself less than the above-mentioned width L1.

The rim 13 has lateral branches given respective references 13C and 13D. Thus, as seen from above as in FIG. 1, the rim 13 is U-shaped with its branches extending towards the free end of the second end 13D of the strip. It will be understood that when the collar is in the fastened state, the hook 14 is inserted between these branches. The hook is thus protected all the more securely against any attempt at opening the collar after it has been closed.

The lateral portions 14B and 14C of the outline of the hook are inserted respectively beneath the branches 13D and 13C of the rim 13. Thus, all of the portion of the outline of the hook 14 that is situated at the free end of the end portion 10A of the strip is received beneath the rim.

As can be seen in the figures, the second end 10B of the strip has a cutout 17 which leaves the tongue 12 in the middle region across the width of the strip. This cutout is substantially U-shaped and its branches are directed towards the free end of the end portion 13D of the strip, with the ends of these branches being extended substantially transversely by the transverse portions 17A of the cutout.

Thus, a fraction of the edge of the cutout which is placed in register with the tongue 12 over its three free sides can be pushed substantially radially outwards relative to the collar while presenting an overlying position substantially parallel to the plane of the strip under which the free end of the hook is received.

As a result, the tongue can remain substantially located in the plane of the strip. In order to encourage the fastening effect, it is nevertheless possible to make provision for at least the end portion 12A of the tongue to be pushed radially outwards to a small extent. The free end of the tongue is directed away from the free end of the end portion 10B of the strip.

This end portion 10B presents a bib 15 which extends under the first end portion 10A of the strip when the collar is in the closed state. This bib is located between the tongue 12 and the free end of the end portion 1OB of the strip. It is already partially inserted beneath the hook when the collar is in the open state.

Advantageously, although not shown, the bib 15 and the end region 10A of the strip that carries the hook (the outside strand of the strip) can be fitted in such a manner as to compensate for the thickness of the tongue beneath the outside strand of the strip so as to ensure that the strip when it forms a collar on the object to be clamped bears continuously thereagainst. For example, these means can be of the type described in European patent application No. EP 0 243 224.

The strip of the collar of the invention advantageously includes local stiffening means. In the embodiment shown in the figures, these means are located at the end region 10B of the collar, and in particular on the bib 15. They comprise a central groove 15A disposed between the tongue 12 and the free end of the end portion 10B of the strip, together with two grooves 15B and 15C disposed on either side of the rim 13. Naturally, these grooves which are shown as being set back from the outside face of the collar could equally well be set back from its inside face.

As mentioned above, in the preferred variant, the fastening means which comprise the hook, the tongue 12 (of width L4), and the rim extend over a fraction only of the width of the strip and occupy substantially the middle region of said width. To make the collar, the starting material is a flat strip in which the hook 14 is formed by means of the cutouts 11 and stamping, and in which the tongue 12 and the rim 13 are formed by the cutout 17 and by deformation. Once these fastening means have been made, perfectly plane marginal portions remain on each of the longitudinal edges 11B and 11C of the strip. As a result, the subsequent operation of rolling up the strip can be performed very simply by implementing the "rolling" on these marginal portions.

Figure 4:
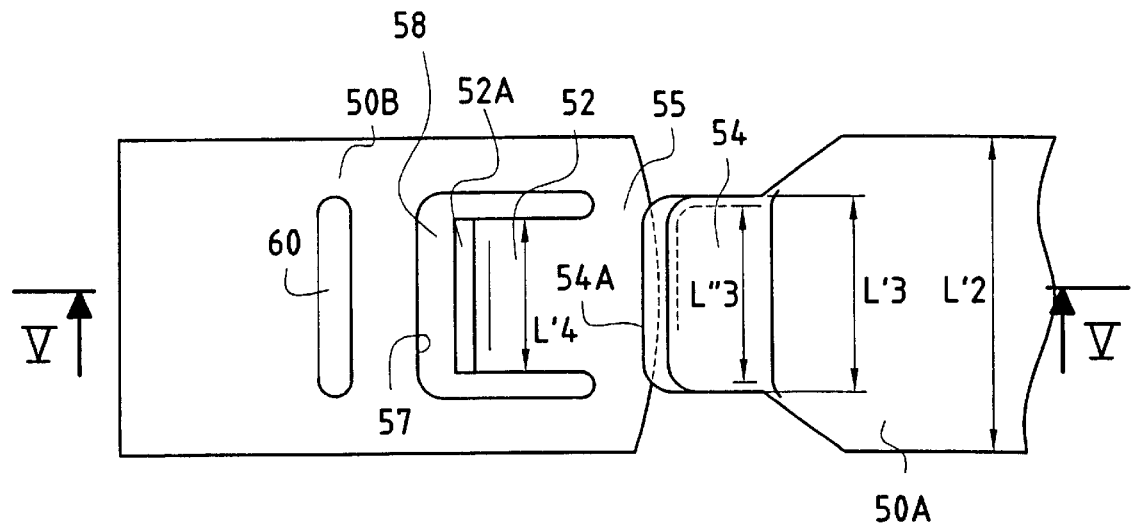
FIG. 4 is a view analogous to FIG. 1, for a second embodiment.
Figure 5:
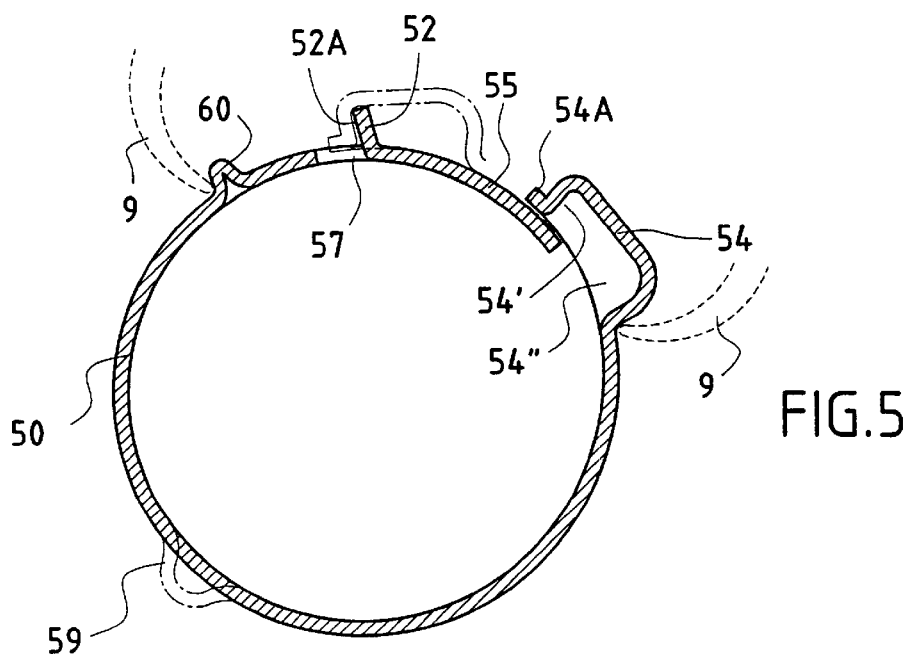
FIG. 5 is a section view on line V—V of FIG. 4.

There follows a description of a second embodiment of the invention with reference to FIGS. 4 and 5.

The collar shown in these figures is obtained by rolling up a strip 50, preferably made of a metal of the type commonly used for making clamping collars.

The first end 50A of this strip carries a hook 45 made by embossing. In the advantageous example shown, the free edge 54A of the hook lies substantially in the plane of the strip. The hook 54 can be analogous to the hook 14 of the first embodiment and it can present borders analogous to the borders 14B and 14C.

The retaining element at the second end 50B of the strip with which said hook co-operates to close the collar is constituted in the present example by a tongue 52 that is generally similar to the tongue 12 of the first embodiment. It thus advantageously presents a free end 52A that is curved towards the outside of the collar.

The tongue is made by a substantially U-shaped cutout formed in the strip, with the branches of the U-shape being directed towards the free end of the end portion 50B of the strip. In the example shown, a gap 58 is left between the outline of the tongue 52 and the outline of the opening 57. This can be obtained by removing material, or at least at the free end of the tongue 52, by folding out the tip 52A of the tongue. As can be seen in FIG. 5, this gap 58 can serve to receive at least part of the free end of the hook, and possibly also the ends of the cheeks 54" thereof.

Figure 1:
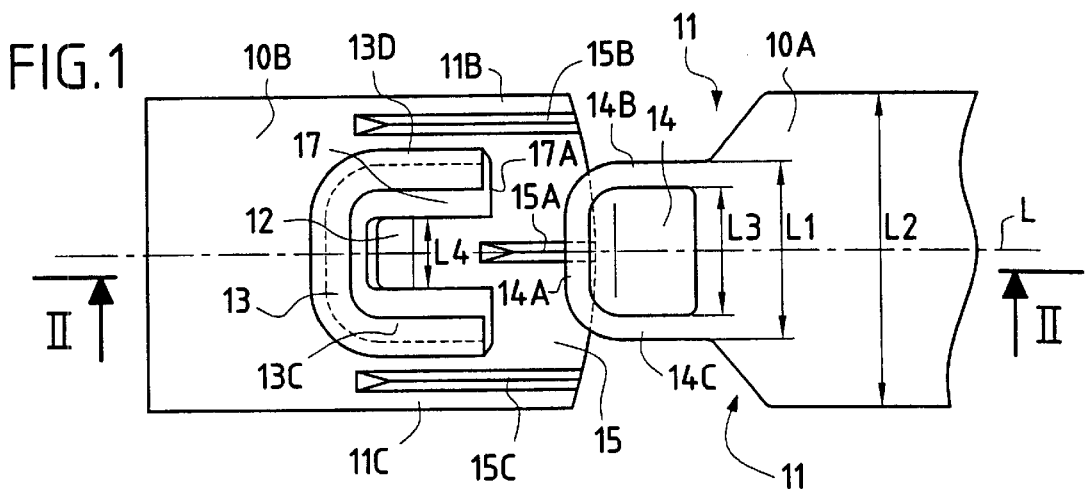
FIG. 1 is a plan view (looking along arrow F in FIG. 2) of the regions comprising the ends of the strip which forms the collar in a first embodiment, which ends carry the fastening means.

The width L'3 of the hook 54 (as measured on the outside face of the collar) is less than the width L'2 of the strip, because of cutouts that are analogous to the cutouts 11 in FIG. 1. The "inside" with L"3 of the hook is thus substantially equal to the width L'4 of the tongue 52.

In FIG. 5, chain-dotted lines show the fastened position of the hook, and it can be seen that its inside edge 54' co-operates with the retaining element 52.

As can also be seen in FIG. 5, the collar can be clamped by bringing the jaws 9 of a pair of pliers to engage behind the hook and behind a projection, a corrugation, or the like 60.

Naturally, this second embodiment is compatible with the presence of the rim 13 of the first embodiment.

The bib 55 in FIGS. 4 and 5 is analogous to the bib 15, and like that bib, it can be provided with stiffening grooves or the like.

Both embodiments are compatible with the presence of one or more corrugations analogous to the corrugation 59 on the strip and represented by chain-dotted lines in FIG. 5, such corrugations serving to maintain clamping even in the event of fluctuations in the diameter of the object being clamped, e.g. due to temperature variations.

A variant suitable for application to either of the two embodiments described above is described below with reference to FIGS. 6 to 8.

The collar made from the strip 80 is analogous to the collars of the preceding figures except in that it further comprises means for locking it axially relative to the object to be clamped.

Such axial locking enables the collar to be placed accurately relative to the object to be clamped, e.g. to ensure that a hose is clamped in genuinely leaktight manner on an endpiece.

Advantageously, the collar has at least one locking tab formed by a radial wall element extending inwards relative to the cylindrical surface defined by the rolled-up strip.

Specifically, the collar has a plurality of locking tabs 81 (e.g. three tabs) that are distributed around its circumference. These tabs are in the form of angular sectors of a discontinuous annular skirt. The locking tabs are spaced apart from one another and they do not impede in any way the reduction in the diameter of the collar that is necessary for clamping purposes.

The locking tabs are designed to co-operate with a zone of the object to be clamped (hose) or with a zone of the support for said object (endpiece on which the hose is engaged), said zone being adapted for this purpose.

For example, setbacks can be formed in the surface of the object to be clamped or in its support. In numerous applications, this zone is constituted rather by an axial end edge or shoulder (formed on the support for the object to be clamped) that is offset a little from the clamping zone proper.

For this purpose, the locking tab(s) is/are advantageously situated on an edge of the collar that is constituted by one of the longitudinal edges 80' of the strip.

As in the example shown, the locking tabs can even be connected to said edge via spacer tabs 82 extending parallel to the axis of the collar on the cylinder formed by the rolled-up strip.

This variant is easily made by forming lateral cutouts 83 in one of the edges of the strip, so as to leave the tabs in place, and the free edges of the tabs are then folded so as to form the locking tabs 81.

Figure 6:
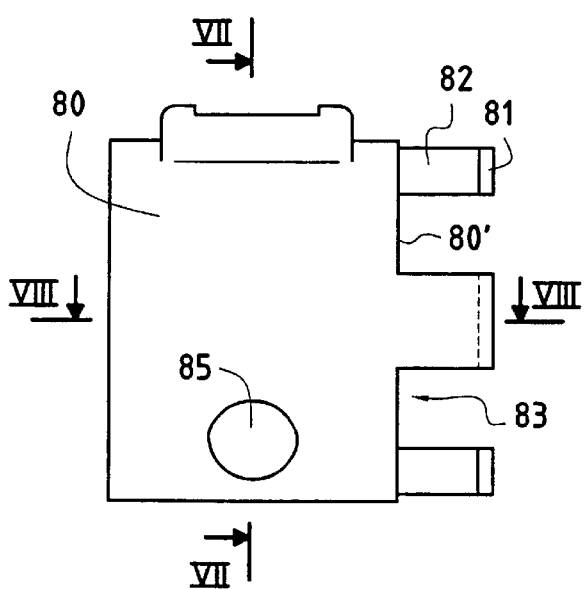
FIG. 6 is an outside view of a variant collar.
Figure 7:
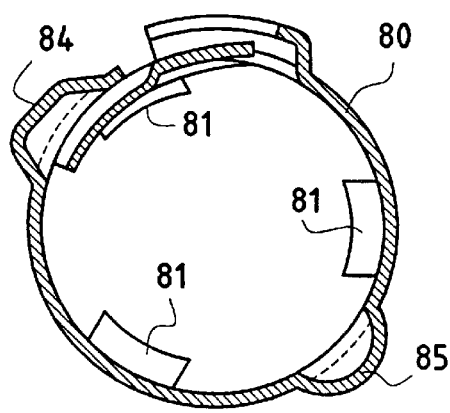
FIGS. 7 and 8 are sections respectively on lines VII—VII and VIII—VIII of FIG. 6.
Figure 8:
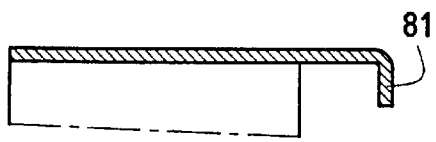

It should also be observed in FIGS. 6 and 7 that the collar includes a projection 85 at a distance from the hook 84. This projection forms a marker to facilitate angular positioning of the collar on the object to be clamped.

Axial locking can be achieved by means other than the tabs described above, for example by forming an annular rim on the periphery of the collar, which rim can be continuous or almost continuous.

What is claimed is:

1. A clamping collar made from a rolled-up strip and comprising first fastening means formed by a hook, projecting towards the outside of the collar and occupying a first end of the strip, and second fastening means occupying the second end of the strip, said second fastening means comprising a retaining element which projects towards the outside of the collar and which is suitable for being engaged beneath the hook to close the collar, the hook presenting a free edge extending substantially on the surface of a cylinder defined by the rolled-up strip, while the second fastening means further comprises a rim projecting towards the outside of the collar and formed in the vicinity of the retaining element, the free edge of the hook being suitable for being engaged beneath the rim while the retaining element is engaged beneath said hook in order to close the collar.

2. A collar as claimed in claim 1, wherein the hook is of a width measured in an axial direction of the cylinder formed by the rolled-up strip, which is less than a width of the strip measured in the same direction.

3. A collar as claimed in claim 2, wherein the rim belonging to the second fastening means presents lateral branches extending substantially lengthwise relative to the strip, said hook being suitable for being engaged between said branches when the collar is in the closed position.

4. A collar as claimed in claim 3, wherein the second end of the strip presents a cutout leaving a tongue which constitutes the retaining element, a portion of an edge of said cutout facing said tongue being deformed substantially radially towards an outside of the collar, thereby forming said rim.

5. A collar as claimed in claim 4, wherein the hook is formed by a projection formed at the first end of the strip, which projection has a fraction of an outline thereof that is preserved to lie substantially in a plane of the strip and form said free edge of the hook.

6. A collar as claimed in claim 1, wherein the second end of the strip presents a cutout leaving a tongue which constitutes the retaining element, a portion of an edge of said cutout facing said tongue being deformed substantially radially towards an outside of the collar, thereby forming said rim.

7. A collar as claimed in claim 6, wherein the hook is formed by a projection formed at the first end of the strip, which projection has a fraction of an outline thereof that is preserved to lie substantially in a plane of the strip and form said free edge of the hook.

8. A collar as claimed in claim 1, wherein the hook is formed by a projection formed at the first end of the strip, which projection has a fraction of an outline thereof that is preserved to lie substantially in a plane of the strip and form said free edge of the hook.

9. A collar as claimed in claim 1, where the second end of the strip rpesents a bib extending beneath the first end of the strip when the collar is in the closed state.

10. A collar as claimed in claim 1, wherein the strip has local stiffening means.

11. A collar as claimed in claim 1, including means for locking the collar axially relative to the object to be clamped.

12. A collar as claimed in claim 11, including at least one locking tab formed by a radial wall element extending inwards relative to the cylindrical surface defined by the rolled-up strip.

13. A collar as claimed in claim 12, wherein the locking tab is situated on an edge of the collar formed by a longitudinal edge of the strip.

14. A clamping collar made from a rolled-up strip and comprising first fastening means formed by a hook located at a first end of the strip, and second fastening means located at the second end of the strip, said second fastening means comprising a retaining element formed by a tongue, projecting substantially radially relative to the strip, the hook being formed by a boss, which is made at the first end of the strip, which has a free edge that is substantially situated in the plane of the strip and which is of a width measured in an axial direction of a cylinder formed by the rolled-up strip that is less than a width of the strip as measured in the same direction the hook having a continuous inside edge having a front part and two cheeks and the width of the retaining element as measured in the same direction being no greater than a width of an inside face of the hook the hook being adapted to overlay said tongue so that to close the collar the tongue is enclosed within an inside space of the hook delimited by said continuous inside edge of the hook.

15. A collar as claimed in claim 14, wherein the width of the retaining element is substantially equal to the width of the inside face of the hook.

16. A collar as claimed in claim 15, wherein the second end of the strip presents a cutout leaving a tongue which constitutes the retaining element.

17. A collar as claimed in claim 16, wherein a gap is formed between the tongue and an edge of said cutout, said gap being suitable for receiving at least a portion of the free edge of the hook.

18. A collar as claimed in claim 14, wherein the second end of the strip presents a cutout leaving a tongue which constitutes the retaining element.

19. A collar as claimed in claim 18, wherein a gap is formed between the tongue and an edge of said cutout, said gap being suitable for receiving at least a portion of the free edge of the hook.

20. A collar as claimed in claim 14, including means for locking the collar axially relative to the object to be clamped.

21. A collar as claimed in claim 20, including at least one locking tab formed by a radial wall element extending inwards relative to the cylindrical surface defined by the rolled-up strip.

22. A collar as claimed in claim 21, wherein the locking tab is situated on an edge of the collar formed by a longitudinal edge of the strip.

* * * * *

UNITED STATES PATENT AND TRADEMARK OFFICE
CERTIFICATE OF CORRECTION

PATENT NO.    : 6,568,043 B1
DATED         : May 27, 2003
INVENTOR(S)   : Detable et al.

It is certified that error appears in the above-identified patent and that said Letters Patent is hereby corrected as shown below:

<u>Column 8,</u>
Line 36, change "rpesents" to -- presents --.

Signed and Sealed this

Fifteenth Day of July, 2003

JAMES E. ROGAN
*Director of the United States Patent and Trademark Office*